United States Patent [19]

Peters

[11] Patent Number: 4,712,427
[45] Date of Patent: Dec. 15, 1987

[54] VIBRATING BEAM ACCELEROMETER WITH VELOCITY CHANGE OUTPUT

[75] Inventor: Rex B. Peters, Woodinville, Wash.

[73] Assignee: Sundstrand Data Control, Inc., Redmond, Wash.

[21] Appl. No.: 908,356

[22] Filed: Sep. 17, 1986

Related U.S. Application Data

[63] Continuation-in-part of Ser. No. 789,752, Oct. 21, 1985, abandoned.

[51] Int. Cl.$^4$ ............................................. G01P 15/10
[52] U.S. Cl. ................................................. 73/517 AV
[58] Field of Search ........... 73/517 AV, 510, DIG. 1, 73/503, 862.59; 364/565, 566

[56] References Cited

U.S. PATENT DOCUMENTS

| | | | |
|---|---|---|---|
| 3,332,290 | 7/1967 | Bock et al. | 73/517 AV |
| 4,467,651 | 8/1984 | Peters et al. | 73/517 AV |
| 4,479,385 | 10/1984 | Koehler | 73/517 AV |

Primary Examiner—John Chapman
Attorney, Agent, or Firm—Christensen, O'Connor, Johnson & Kindness

[57] ABSTRACT

A dual sensor, frequency output accelerometer that does not require either high sampling rates or mechanical matching of the sensors to achieve high levels of accuracy. In one embodiment, the accelerometer comprises a first sensor (12, 14, 16) that produces an output signal $S_1$ having a frequency $f_1$ related to acceleration along the sensitive axis, and a second sensor (18, 20, 22) that produces a second signal $S_2$ having a frequency $f_2$ related to acceleration along the sensitive axis, the sensors being arranged such that a given acceleration causes the frequency of one output signal to increase and the frequency of the other output signal to decrease. Velocity change $\Delta V$ during time interval T is determined according to:

$$\Delta V = A[\Delta\phi + FT + B\Sigma\phi]$$

where A, F and B are constants, $\Delta\phi$ is the difference between the phase changes of the output signals over time interval T, and $\Sigma\phi$ is the sum of the phase changes of the output signals over time interval T. Higher order correction terms are also described for very high precision applications. Also disclosed is an accelerometer or measuring velocity change during a time interval that includes a subinterval during which electrical power is unavailable.

14 Claims, 5 Drawing Figures

VIBRATING BEAM ACCELEROMETER WITH VELOCITY CHANGE OUTPUT

RELATED APPLICATIONS

This application is a continuation-in-part of application Ser. No. 789,752, filed Oct. 21, 1985 and now abandoned.

TECHNICAL FIELD

The present invention relates to vibrating beam accelerometers and, in particular, to a push-pull vibrating beam accelerometer that directly determines velocity change.

BACKGROUND OF THE INVENTION

In a vibrating beam accelerometer, a proof mass is suspended from a support by a flexure hinge, and a vibrating beam force transducer is connected along the sensitive axis of the accelerometer between the proof mass and the support. An acceleration along the sensitive axis results in a compression or tension force on the vibrating beam, resulting in a change in the beam vibration frequency. The beam vibration frequency is measured and used to determine acceleration.

A push-pull vibrating beam accelerometer typically comprises two vibrating beam sensors, as described above, mounted in a common housing such that a given acceleration results in a compression force on one vibrating beam and a tension force on the other vibrating beam. Each sensor produces an output signal having a frequency corresponding to the sensed acceleration, and the acceleration is calculated essentially as a function of the difference in the frequencies of the two output signals. This push-pull approach is typically more accurate than a single sensor instrument, due to the elimination of common mode errors.

Prior vibrating beam accelerometers have demonstrated the accuracy required for many kinds of inertial navigation and missile guidance applications, but have also been characterized by certain limitations. One limitation results from the fact that a vibrating beam acceleration sensor is an inherently non-linear device, and the sensor output must be linearized in some fashion before acceleration is integrated to determine velocity change. Another limitation is that output circuits used with vibrating beam accelerometers cannot measure velocity changes that occur during time intervals in which electrical power is unavailable. Such accelerometers are therefore incapable of operating through a short-term loss of power. Two prior art techniques exist for dealing with the first limitation, but they are complex and expensive. No techniques have previously been available for measuring velocity change over a time interval in which a power loss occurred.

Both electronic and mechanical techniques have previously been available for dealing with the nonlinearity of vibrating beam accelerometers. The electronic approach consists of measuring frequency by counting cycles of the sensor output signals (or signal) against a common clock, dividing the output frequency counts by the clock count to determine the frequencies, and then sampling and numerically processing the result to obtain acceleration. The acceleration is then numerically integrated to determine velocity change. This process is complex, and the sampling must be done at high speed to achieve accuracy. The mechanical approach to the nonlinearity problem is specific to the dual sensor accelerometer, and consists of mechanically trimming and matching the zero acceleration vibration frequencies and scale factors of the two sensors, so that a simple frequency difference is a sufficiently linear measure of acceleration. However the mechanical adjustments required to match two sensors to a few parts per million are difficult and timing consuming, and tend to be self-defeating since they must be made prior to sealing the sensors and isolating the sensors from the environment. The mechanical trims and adjustments can therefore never be fully stabilized.

SUMMARY OF THE INVENTION

The present invention provides a dual sensor frequency output accelerometer that does not require either high sampling rates or mechanical matching of the sensors to achieve a high level of accuracy.

In one aspect, the accelerometer comprises a pair of acceleration sensors, and means for determining velocity change $\Delta V$ along a sensitive axis during a selected time interval T. Each acceleration sensor is operative to produce an output signal having a frequency related to the acceleration along the sensitive axis. The sensors are arranged such that a given acceleration along the sensitive axis causes the frequency of one of the output signals to increase, and causes the frequency of the other output signal to decrease. Velocity change $\Delta V$ during time interval T is determined in accordance with the relation:

$$\Delta V = A[\Delta \phi + FT + B\Sigma \phi]$$

where A, F and B are constants, $\Sigma \phi$ is the difference between the phase changes of the output signals over time interval T, and $\Sigma \phi$ is the sum of the phase changes of the output signals over time interval T. Each sensor preferably comprises a vibrating beam force sensing element, with each force sensing element being connected to a proof mass constrained to have a single degree of freedom defining the sensitive axis. The means for determining velocity change may comprise means for determining the relative phase of one output signal with respect to the other output signal at the beginning and end of time interval T, and means for determining the number of complete cycles of each output signal that occur during time interval T.

In another aspect, an accelerometer is provided for measuring velocity change along a sensitive axis during a time interval from $t_{n-1}$ to $t_n$ that includes a subinterval during which electrical power is unavailable. The accelerometer comprises a pair of acceleration sensors, and means for determining the velocity change $\Delta V$ along the sensitive axis during such time interval. Each acceleration sensor is operative to produce an output signal having a frequency related to the acceleration along the sensitive axis. The sensors are arranged such that a given acceleration along the sensitive axis causes the frequency of one output signal to increase and causes the frequency of the other output signal to decrease. The means for determining $\Delta V$ includes means for determining and storing a relative phase value corresponding to the relative phase of one output signal with respect to the other output signal at each of times $t_{n-1}$ and $t_n$. The means for determining velocity change further comprises means for determining $\Delta V$ in accordance with relation:

$$\Delta V = A\Delta\phi$$

where A is a calibration constant and $\Delta\phi$ is the change in relative phase between times $t_{n-1}$ and $t_n$. The means for determining velocity change may also include means for adjusting $\Delta\phi$ at time $t_n$ by $\pm 2\pi$, such that $\Delta\phi$ for the time interval from $t_{n-1}$ to $t_n$ does not exceed $\pm\pi$.

In another aspect, an accelerometer is provided for measuring velocity change along a sensitive axis during a time interval from $t_{n-1}$ to $t_n$ that includes a subinterval during which electrical power is unavailable. The accelerotomer comprises a pair of first sensors that produce a pair of first output signals and that have a scale constant $A_1$ and a pair of second sensors that produce a pair of second output signals and that have a scale constant $A_2$ that is not an integer multiple of $A_1$. The change of relative phase of the first output signals between times $t_{n-1}$ and $t_n$ ($\Delta W_1$) and a similar quantity for the second output signals ($\Delta W_2$) are determined, and integer values for i and j are determined such that:

$$A_1(\Delta W_1 + i) = A_2(\Delta W_2 + j)$$

The velocity change $\Delta V$ may then be determined as:

$$\Delta V = 2\pi A_1(\Delta W_1 + i) = 2\pi A_2(\Delta W_2 + j)$$

In another aspect, velocity change $\Delta V$, during time interval T, is determined in accordance with the relation $$\Delta V = A_1[(1-A_2\Sigma\phi)\Delta\phi + A_3(\Delta\phi)^3 + A_4\Sigma\phi + A_5(\Delta\phi)^2 + A_0]$$

where $A_0$, $A_1$ and $A_4$ are nonzero constants, and where $A_2$, $A_3$ and $A_5$ are constants, at least one of which is nonzero. The $A_2$, $A_3$ and $A_5$ terms may be used to correct for particular types of nonlinearities in very high precision applications.

DETAILED DESCRIPTION OF THE INVENTION

Figure 1:
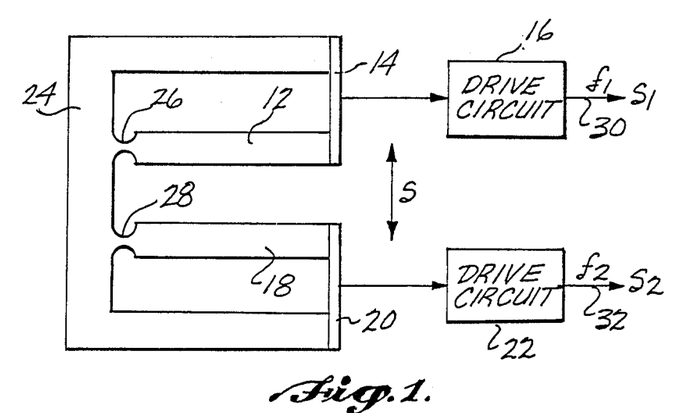
FIG. 1 is a schematic view of a push-pull vibrating beam accelerometer.

FIG. 1 schematically illustrates a push-pull vibrating beam accelerometer. The accelerometer includes a first acceleration sensor comprising proof mass 12, force sensing element 14 and drive circuit 16, and a second acceleration sensor comprising proof mass 18, force sensing element 20 and drive circuit 22. Each force sensing element may comprise a quartz crystal having a double ended tuning fork construction, as illustrated in U.S. Pat. No. 4,215,570. Proof masses 12 and 18 are mounted to support 24 by flexure hinges 26 and 28 respectively. Each flexure hinge constrains its associated proof masses to a single degree of freedom along sensitive axis S. Force sensing element 14 has one end attached to support 24 and a second end attached to proof mass 12, such that the proof mass is suspended at one end by flexure hinge 26 and at the other end by force sensing element 14. In a similar manner, force sensing element 20 has one end attached to support 24 and a second end attached to proof mass 18, such that proof mass 18 is suspended at one end by flexure hinge 28 and at its other end by force sensing element 20. In the illustrated embodiment, both force sensing elements are parallel to the sensitive axis S of the accelerometer, although other arrangement may also be used. As is well known to those skilled in the art, the force sensing elements can also be attached to the proof masses at the centers of precussion or the centers of mass of the respective proof masses, rather than at the ends of the proof masses opposite the flexure hinges.

As may be appreciated from FIG. 1, a given acceleration along sensitive axis S will result in a compression force on one force sensing element and a tension force on the other force sensing element. For example, an upward acceleration along the sensitive axis will result in a tension force on force sensing element 14 and a compression force on force sensing element 30. Force sensing element 14 and drive circuit 16 comprise a force to frequency transducer that has a resonant frequency $f_1$, and that produces output signal S having frequency $f_1$. In a manner analogous to a vibrating string, the resonant frequency $f_1$ will increase in response to a tension force exerted along force sensing element 14 and will decrease in response to a compression force exerted along the force sensing element. Force sensing element 20 and drive circuit 22 comprise a similar force to frequency transducer that has a resonant frequency $f_2$ and that produces output signal $S_2$, the frequency $f_2$ rising and falling in response to tension and compression forces respectively along force sensing element 20. A given acceleration along sensitive axis S will therefore result in approximately equal but opposite changes in frequencies $f_1$ and $f_2$. It will be appreciated that a similar result could be achieved by attaching both force sensing elements to the same proof mass.

The acceleration versus frequency characteristic of a vibrating beam force transducer has the general form:

$$a = C\left(1 - \left(\frac{f}{f_0}\right)^2\right)\left[1 - D\left(1 - \left(\frac{f}{f_0}\right)^2\right)\right] \quad (1)$$

where C is a scaling constant, D is a linearity constant, $f_0$ is the output frequency corresponding to zero acceleration, f is the output frequency corresponding to acceleration a. This equation can be inverted to give:

$$f = f_0 + k_1(a + k_2 a^2 + k_3 a^3 + \ldots) \quad (2)$$

where $$k_1 = -f_0/2C \quad (3)$$

$$k_2 = (1 + 4D)/4C \quad (4)$$

and $$k_3 = \frac{1 + 4D + 16D^2}{8C^2} \quad (5)$$

The constant D is small (e.g., D=0.025) and tends to be nearly constant for a given beam design. However, $f_0$ and C vary considerably from beam to beam due to small dimensional differences. In a push-pull vibrating beam accelerometer, it is in principle possible to mechanically adjust the two sensors such that:

$$f_{01} = f_{02} \quad (6)$$

$$C_1 = C_2 \quad (7)$$

where $f_{01}$ and $f_{02}$ are the zero acceleration vibration frequencies of the first and second sensors respectively, and $C_1$ and $C_2$ are the scaling constants of the first and second sensors respectively. In such a case, assuming that D is constant, the quadratic ($a_2$) term for the frequency difference $f_1 - f_2$ drops out, and the frequency difference can be written:

$$f_1 - f_2 = 2k_1 a + k_3 a^3 + \ldots \quad (8)$$

The $a^3$ term produces a variable scale factor shift that is on the order of one part per million per g of acceleration squared, and can be ignored in many cases. However, the problem with this approach is that the mechanical adjustments required to achieve the equalities of Equations (6) and (7) to a few parts per million are difficult and time consuming, and tend to be self-defeating since they must be made on unsealed sensors. Prior art push-pull accelerometers have therefore typically relied on an electronic approach that does not rely on the equalities of Equations (6) and (7). In the electronic approach, the frequencies $f_1$ and $f_2$ are sampled at a high rate, and the resulting samples are converted to acceleration. After acceleration is determined for each sample, the acceleration is integrated over time to produce net velocity change.

The present invention is based on the discovery that velocity change can be directly calculated from the output signals of a push-pull accelerometer without the need for mechanical matching of the sensors or for a high sampling rate. In accordance with the present invention, the velocity change $\Delta V$ over a given time interval T is determined as follows:

$$\Delta V = A(\Delta\phi + FT + B\Sigma\phi) \quad (9)$$

where A, F and B are constants, $\Delta\phi$ is the difference between the phase changes of the output signals of the two sensors over time interval T, and $\Sigma\phi$ is the sum of the phase changes of the output signals over time interval T. The constants A, F, and B are determined as follows:

$$A = (k_{11} + k_{12} + B(k_{11} - k_{12}))^{-1} \quad (10)$$

$$F = -(f_{01} - f_{02}) - B(f_{01} + f_{02}) \quad (11)$$

and $$B = \frac{k_{12}k_{22} - k_{11}k_{21}}{k_{12}k_{22} + k_{11}k_{21}} \quad (12)$$

where $k_{11}$ and $k_{12}$ are the constant $k_1$ for sensors 1 and 2 respectively, $k_{21}$ and $k_{22}$ are constant $k_2$ for sensors 1 and 2 respectively, and $f_{01}$ and $f_{02}$ are constant $f_0$ for sensors 1 and 2 respectively.

Figure 2:
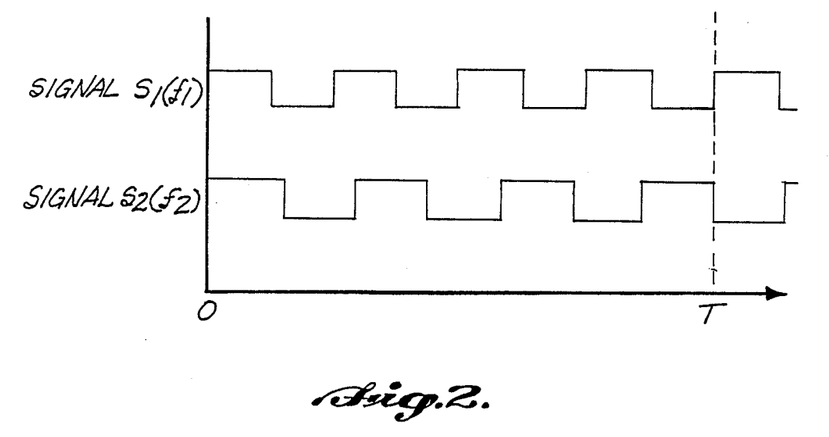
FIG. 2 is a timing diagram illustrating the calculation of $\Delta\phi$ and $\Sigma\phi$.

Determination of the quantities $\Delta\phi$ and $\Sigma\phi$ of Equation (9) is schematically illustrated in FIG. 2. In FIG. 2, output signals $S_1$ and $S_2$ of sensors 1 and 2 respectively are represented by square waves, with the frequency $f_1$ of signal $S_1$ being greater than the frequency $f_2$ of signal $S_2$. The time interval from zero to T contains four full cycles of signal $S_1$. The total phase change of signal $S_1$ in this time interval is therefore $4 \times 2\pi = 8\pi$. In the same time interval, output signal $S_2$ changes of 3.5 full cycles, for a phase change of $7\pi$. In this example, the difference between the phase changes $\Delta\phi$ is equal to $\pi$, and the sum of the phase changes $\Sigma\phi$ is equal to $15\pi$. The relative phase of signal $S_1$ with respect to signal $S_2$ is zero at time zero and $\pi$ at time T. In general, the "change in relative phase" will be equal to the "phase change difference" plus $2\pi i$, where i is zero or a positive or negative integer.

Assume that the quantities $\Delta\phi$ and $\Sigma\phi$ are to be determined at a series of sample times $t_{n-1}, t_n, t_{n+1} \ldots$, and that sample times $t_n$ will be selected to be synchronous with respect to the $S_2$ signal, i.e., the sample times occur every $N_2$ cycles of signal $S_2$. The quantity $\Delta\phi_n$ for the time interval from $t_{n-1}$ to $t_n$ may then be written as:

$$\Delta\phi_n = \phi_1(t_n) - \phi_1(t_{n-1}) - \phi_2(t_n) + \phi_2(t_{n-1}) \quad (13)$$

where $\phi_1$ and $\phi_2$ refer to the phases of signals $S_1$ and $S_2$, respectively, and where the values in parentheses represent time. Equation (13) can be rewritten as:

$$\Delta\phi_n = 2\pi(N_1 - N_2 + R_{n-1}/P_{n-1} - R_n/P_n) \quad (14)$$

where $N_1$ is the number of complete cycles of signal $S_1$ in the time interval $t_{n-1}$ through $t_n$, $N_2$ is the number of cycles of the $S_2$ signal in the same time interval, and where the expression $R_n/P_n$ represents the relative phase or fraction of a cycle of signal $S_1$ with respect to signal $S_2$ at time $t_n$. A similar analysis for $\Sigma\phi_n$ leads to:

$$\Sigma\phi_n = 2(N_1 + N_2 - R_{n-1}/P_{n-1} + R_n/P_n) \quad (15)$$

Figure 4:
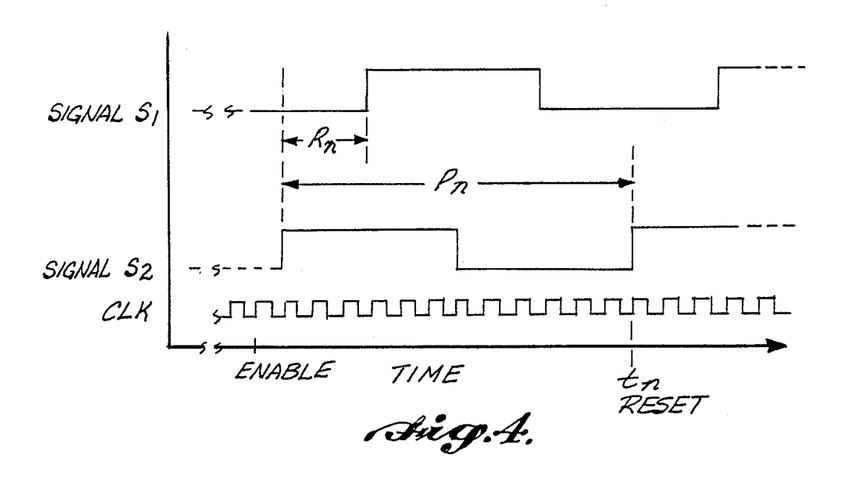
FIG. 4 is a timing diagram illustrating the operation of the system of FIG. 3.

The significance of parameters R and P is indicated in FIG. 4. Ignoring the CLK signal for the moment, for sample time $t_n$, $P_n$ represents the period of the last full cycle of signal $S_2$, and $R_n$ represents the time between the beginning of the last full cycle of signal $S_2$ and the beginning of the next cycle of signal $S_1$. $P_n$ is thus a measure of the frequency $f_2$ of signal $S_2$ at time $r_n$, and $R_n/P_n$ is a measure of the relative phase of signal $S_1$ with respect to signal $S_2$ at time $t_n$. It should be noted that if high resolution is not required, the R and P terms in Equations (14) and (15) can be ignored, and velocity change can be computed directly from the $N_1$ and $N_2$ values. The error in this approximation is not cumulative and can never exceed one cycle.

Figure 3:
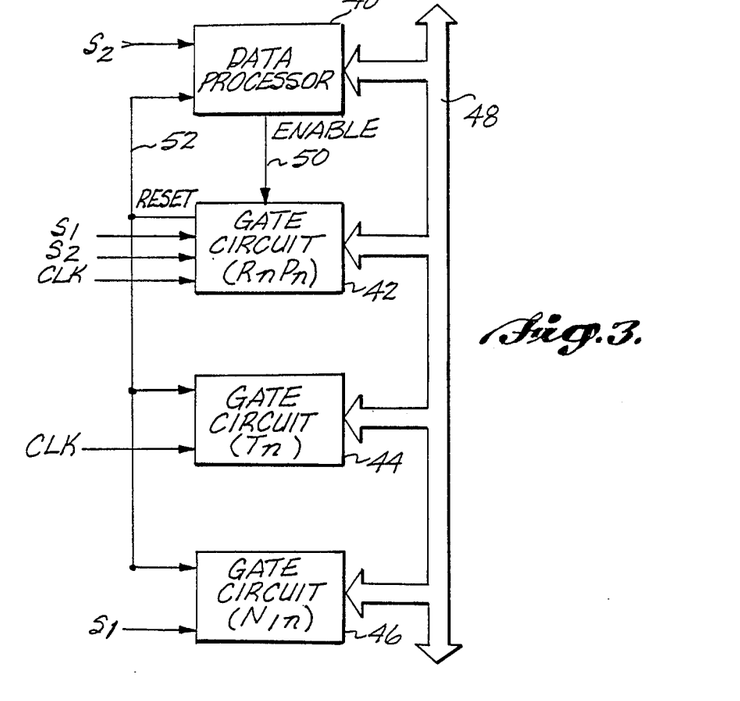
FIG. 3 is a block diagram of a system for determining $\Delta V$ in accordance with the present invention.

FIG. 3 set forth a block diagram of a system for determining velocity change $\Delta V$ in accordance with Equations (9), (14) and (15). The system comprises data processor 40 and gate circuits 42, 44 and 46 interconnected by bus 48. Each gate circuit comprises one or more gated counters, as detailed below, and data processor 40 periodically samples the counts accumulated by the gate circuits at each of a series of sample times $t_n$. In general, the sampling rate may be either synchronous or asynchronous with respect to signals $S_1$ or $S_2$. For purpose of illustration, the system will be described for the case in which sampling occurs every $N_2$ cycles of signal $S_2$. Data processor 40 directly receives signal $S_2$, as indicated in FIG. 3, and issues an enable signal on line 50 every $N_2$ cycles of the $S_2$ signal. A short time later, gate circuit 42 issues a RESET signal on line 52 that causes counting operations for the current sample time ($t_n$) to stop, and that signals the data processor that the accumulated counts may be read (via bus 48) and processed. The data processor thereupon proceeds to read the accumulated counts, and to determine the net velocity change $\Delta V_n$ for the interval $t_{n-1}$ to $t_n$. As described below, the appearance of the RESET signal on line 52 is coincident with sampling time $t_n$ as shown in FIG. 4.

Gate circuit 42 receives signals $S_1$ and $S_2$ and clock signal CLK, and periodically determines the values of parameters P and R. The clock signal CLK is a periodic signal having a frequency significantly higher than the frequencies $f_1$ and $f_2$ of signals $S_1$ and $S_2$, respectively. The CLK signal may be provided by an independent clock generator, or may be derived from the internal clock of data processor 40. Gate circuit 42 may be implemented using two counters, each of which increments its count with each cycle of the CLK signal. Both counters are reset to zero and begin counting at the first zero crossing or rising edge of signal $S_2$ that occurs after receipt of the enable signal on line 50. The first counter stops counting at the next rising edge of signal $S_1$. The second counter stops counting at the next rising edge of signal $S_2$. The contents of the first and second counters thereby correspond to parameters $R_n$ and $P_n$ respectively of FIG. 4. When the second counter stops counting, gate circuit 42 issues the RESET signal on line 52, the RESET signal thereby corresponding to sampling time $t_n$.

Gate circuit 44 comprises a counter and a latch. The counter increments its count with each cycle of the CLK signal. Each time that a RESET signal appears on line 52, the contents of the counter are transferred to the latch, and the counter is reset to zero. Gate circuit 44 thereby determines the time (in cycles of the CLK signal) between successive RESET signals, and thus determines the time interval $T_n$ between successive sampling times $t_{n-1}$ and $t_n$.

Gate circuit 46 also comprises a counter and a latch. The counter increments its count with each rising edge of the $S_1$ signal. At the appearance of each RESET signal on line 52, the contents of the counter are transferred to the latch, and the counter is reset to zero. Gate circuit 46 therefore determines the quantity $N_{1n}$, i.e., the quantity $N_1$ (as defined above in connection with Equations (14) and (15)), for sampling time $t_n$.

In response to the RESET signal, data processor 40 proceeds to read the parameters $R_n$, $P_n$, $T_n$ and $N_{1n}$ corresponding to sampling time $t_n$, and then determines $\Delta V_n$, the velocity change between times $t_{n-1}$ and $t_n$. Combining Equations (9) (14) and (15), one may write:

$$\frac{\Delta V_n}{2\pi A} = N_{1n} - N_2 + W_{n-1} - W_n + B[N_{1n} + N_2 + W_n - W_{n-1}] + FT_n \quad (16)$$

$$= N_{1n}(1 + B) - (1 - B)(N_2 + W_n - W_{n-1}) + FT_n$$

where $W_n = R_n/P_n$ and $W_{n-1} = R_{n-1}/P_{n-1}$. After data processor 40 performs the calculation of Equation (16), the data processor adds $\Delta V_n/2\pi A$ to a summing register containing the value accumulated for $\Delta V/2\pi A$ through the preceding sample times. The current velocity may then be determined by multiplying the contents of the summing register by $2\pi A$. In performing the calculation of Equation (16), it is to be noted that the quantity $W_n$ added at one sample time is precisely subtracted (as $W_{n-1}$) at the next sampling time. There is therefore no round-off or accumulation error in the $\Delta V$ calculation due to the W terms. It is also noteworthy that in Equation (16), the accuracy of the calculation is not a function of the sampling rate. An appropriate sampling rate may therefore be determined simply by the need for current velocity information.

In a dual beam accelerometer in which the sensors are matched such that equalities of Equations (6) and (7) are true, constants F and B of Equation (9) are zero, and Equation (9) reduces to $\Delta V = A\Delta\phi$. The term $FT + B\Sigma\phi$ of Equation (9) therefore represents a correction term that eliminates the bias and linearity errors that result if the beams and pendulums are not perfectly matched. For a typical dual sensor accelerometer, this correction term will only contribute a few percent to the total $\Delta V$. The dominance of the $A\Delta\phi$ term provides a means for recovering velocity information when the accelerometer electronic system is shut down for a few milliseconds, e.g., by a nuclear pulse. Crystals used in vibrating beam accelerometers typically oscillate with Q values of at least a few thousand. When the drive circuit is deprived of power, the crystal will continue to vibrate for some time, slowly decaying in amplitude but still functioning as a force-to-frequency converter. The number of cycles required to decay to 1/e of the original amplitude is $Q/\pi$. For $Q = 3,000$, the decay time is therefore approximately a thousand cycles, or 25 milliseconds at a vibration frequency $(f_0)$ of 40 kilohertz. This is more than ample to bridge many power outages. During such an outage, the term $FT + B\Sigma\phi$ in Equation (9) is lost, but the term $A\Delta\phi$ may be determined, as described below. Because the term $FT + B\Sigma\phi$ contributes only a few percent to the total velocity change, the loss of this term for a few milliseconds is inconsequential.

Assume that the time interval $T_n$ from time $t_{n-1}$ to time $t_n$ includes a subinterval during which drive circuits 16 and 22 (FIG. 1) are deprived of power. Because force sensing elements 14 and 20 continue to vibrate, signals $S_1$ and $S_2$ will have the same phase relationship to one another after the subinterval as if the power loss had never occurred. Although the total phase change of the $S_1$ and $S_2$ signals during the power loss cannot be determined, it will be possible to determine the phase change difference $\Delta\phi_n$ over time interval $T_n$, provided that the actual relative phase change difference does not exceed $\pm 180°$. Rewriting Equation (16) for the case $B = F = 0$, one obtains:

$$\frac{\Delta V_n}{2\pi A} = N_{1n} - N_2 + W_{n-1} - W_n = \Delta N + \Delta W \quad (17)$$

where $\Delta N = N_{1n} - N_2$ is equal to the (integer) number of full cycles of relative phase change between signals $S_1$ and $S_2$ during $T_n$, and where $\Delta W = W_{n-1} - W_n$ is equal to the fractional phase change between signals $S_1$ and $S_2$ during $T_n$. When a power outage is known to have occurred, the quantity $\Delta N$ is unknown, but the quantity $\Delta W$ may be calculated, provided that $W_{n-1}$ has been preserved through the power outage. If the phase change difference between signals $S_1$ and $S_2$ does not exceed $\pm 180°$, the quantity $\Delta W$ for the time interval that includes the power outage may be used to determine the quantity $\Delta N$ for that period as follows:

| $\Delta W$ | $\Delta N$ |
| --- | --- |
| $-1.0$ to $-0.5$ | $+1$ |

| ΔW | ΔN |
|---|---|
| −0.5 to +0.5 | 0 |
| +0.5 to +1.0 | −1 | the values of +1 and −1 being equivalent to adjusting the observed phase change difference by $2\pi$ and $-2\pi$ respectively in accordance with the assumption that the actual phase change difference does not exceed ±180°. Once power is resumed after an outage, data processor 40 transfers operations to an initialization routine that performs the adjustments indicated above to determine $\Delta V_n\text{-}2\pi$ A for the time interval that includes the power outage, and adds the result to the summing register. Current velocity information is therefore determined after the outage by preserving only two quantities—$W_{n-1}$ and the contents of the summing register—through the period of power loss. Such quantities can be preserved through the use of electronically erasable PROM (EEPROM) or through other known memory means capable of retaining data through a power outage.

An alternate technique for determining velocity change during a time interval that includes a subinterval during which power is lost is to calculate the quantity $\Delta V_n/2\pi A$ in Equation (16) as if no power outage had occurred, but to then adjust such quantity as follows:

| Calculated $\Delta V_n/2\pi A$ | Adjustment |
|---|---|
| −1.5 to −0.5 | +1 |
| −0.5 to +0.5 | 0 |
| +0.5 to +1.5 | −1 |

The advantage of this technique is that it preserves the $\Sigma\phi$ data accumulated from the end of the power outage until $t_n$.

Figure 5:
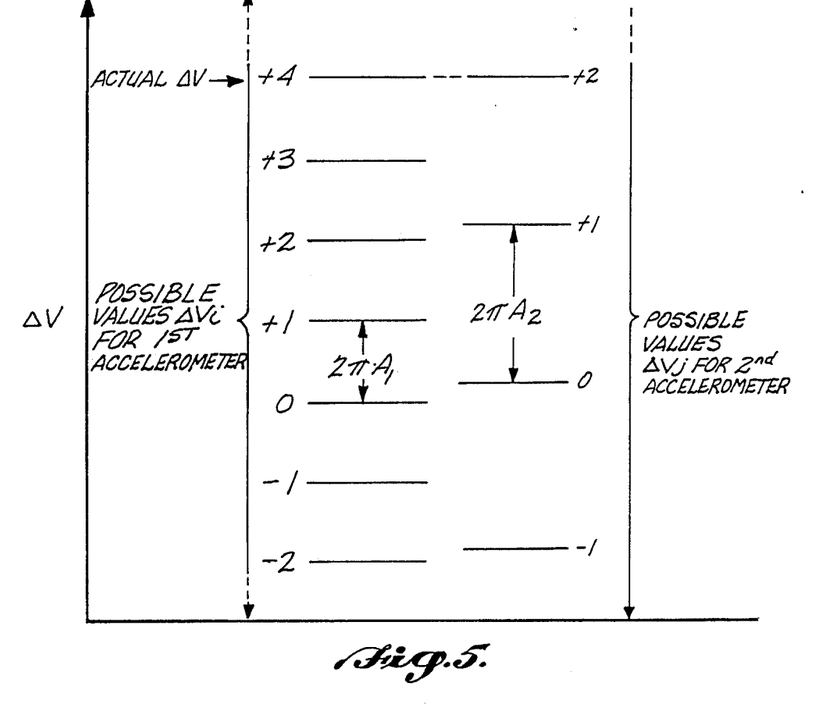
FIG. 5 is a graph illustrating the determination of an unambiguous value for $\Delta V$ after a power loss based upon the output of two accelerometers.

When the net phase change difference may exceed 180° during a power loss, then other techniques must in general be used for determining or estimating $\Delta V$ for the interval in which the power loss occurred. If the total velocity change is known at least approximately from the dynamics of the event that caused the power outage, then such knowledge may be sufficient. Alternatively, $\Delta V$ may be determined using two accelerometers having values of the constant A that are noninteger multiples of one another. This principle is illustrated in FIG. 5. The left-hand side of the graph in FIG. 5 illustrates a series of possible values $\Delta V_i$ for the quantity $\Delta V$ for a series of different estimates of the quantity $\Delta N$ (−2 through +4) for the first accelerometer, the values $\Delta V_i$ being given by:

$$\Delta V_i = 2\pi A_1(\Delta W_1 + i) \quad (18)$$

where i is an integer (positive, negative or zero), and $A_1$ is the parameter A for the first accelerometer. The difference between adjacent levels is $2\pi A_1$. The right-hand side of FIG. 5 provides a similar illustration for the second accelerometer, for which the possible values of $\Delta V$ are given by:

$$\Delta V_j = 2\pi A_2(\Delta W_2 + j) \quad (19)$$

where j is an integer and $A_2$ is the parameter A for the second accelerometer. The differences between adjacent levels are proportional to $2\pi A_2$. The actual value of $\Delta V$ is the value at which possible values for both the first and second accelerometers exist, i.e., the value at which $A_1(\Delta W_1 + i) = A_2(\Delta W_2 + j)$ for integer i and j.

The calculations indicated by Equation (16) above account for the dominant quadratic nonlinearities of the vibrating beam force transducers in a push-pull vibrating beam accelerometer. However, Equation (16) omits certain higher order effects which may be significant in very high precision applications. If such effects are taken into account, then the formulation set forth in Equation (9) above can be expanded as follows:

$$\Delta V = A_1[1 - A_2\Sigma\phi)\Delta\phi + A_3(\Delta\phi)^3 + A_4\Sigma\phi + A_5(\Delta\phi)^2 + A_0] \quad (20)$$

where $A_0 - A_5$ are constants, with $A_1$, $A_4$ and $A_0$ corresponding to the constants A, B and F in Equation (9). The terms $\Delta\phi$ and $\Sigma\phi$ are determined as per Equations (14) and (15) above. The three new terms in Equation (20), i.e., the terms that include constants $A_2$, $A_3$ and $A_5$, may be added as required, depending upon the level of accuracy required. The $A_2$ term corrects the scale factor for cubic rectification error. The $A_3$ term corrects static linearity for the third order term, and the $A_5$ term can be used to separately correct purely dynamic quadratic rectification effects, such as crystal mistracking, as a function of frequency or gas pumping effects in accelerometer damping gaps. In the assumed case of a sensor with no tracking error and no asymmetry, the formulation set forth in Equation (20) is exact, with $A_5$ equal to zero, except for a $g^3$ term which will never be more than a few percent of the uncorrected cubic term, and which vanishes when the sampling frequency is as large or larger than the highest vibration frequency.

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. An accelerometer for measuring velocity change along a sensitive axis, comprising:
   a pair of acceleration sensors, each sensor being operative to produce an output signal having a frequency related to the acceleration along the sensitive axis, the sensors being arranged such that a given acceleration along the sensitive axis causes the frequency of one output signal to increase and the frequency of the other output signal to decrease; and
   means for determining the velocity change $\Delta V$ along the sensitive axis during a selected time interval in accordance with the relation:

$$\Delta V = A[\Delta\phi + FT + B\Sigma\phi]$$

where A, F and B are nonzero constants, T is the length of said time interval, $\Delta\phi$ is the difference between the phase changes of the output signals over said time interval and $\Sigma\phi$ is the sum of the phase changes of the output signals over said time interval.

2. The accelerometer of claim 1, wherein each sensor comprises a vibrating beam force sensing element, and wherein each force sensing element is connected to a proof mass constrained to have a single degree of freedom defining the sensitive axis.

3. The accelerometer of claim 1, wherein the means for determining the velocity change includes means for determining the relative phase of one output signal with respect to the other output signal at times $t_{n-1}$ and $t_n$ that correspond to the beginning and ending of said time interval respectively.

4. The accelerometer of claim 3, wherein the means for determining the relative phase comprises means for determining the time difference between preselected periodic characteristics of the output signals, means for determining the period of said other output signal, and means for determining a ratio value corresponding to the quotient of said time difference divided by said period.

5. The accelerometer of claim 3, wherein the means for determining the velocity change includes means for determining the number of complete cycles of each output signal that occur during said time interval.

6. The accelerometer of claim 5, wherein the means for determining the number of complete cycles of each output signal includes means for producing a series of enable signals after every $N_1$ complete cycles of one of the output signals, and means for counting the number of full cycles of the other output signal that occur between successive enable signals.

7. An accelerometer for measuring velocity change along a sensitive axis during a time interval from $t_1$ to $t_2$ that includes a subinterval during which electrical power is unavailable, comprising:

a pair of acceleration sensors, each sensor being operative to produce an output signal having a frequency related to the acceleration along the sensitive axis, the sensors being arranged such that a given acceleration along the sensitive axis causes the frequency of one output signal to increase and the frequency of the other output signal to decrease; and means for determining the velocity change $\Delta V$ along the sensitive axis during said time interval, including means for determining and storing a relative phase value corresponding to the relative phase of one of the output signals with respect to the other output signal at each of times $t_1$ and $t_2$, and means for determining $\Delta V$ in accordance with the relationship:

$$\Delta V = 2\pi A \Delta W$$

where A is a calibration constant and $\Delta W$ is the change in said relative phase between times $t_1$ and $t_2$.

8. The accelerometer of claim 7, wherein each sensor comprises a vibrating beam force sensing element, and wherein each force sensing element is connected to a proof mass constrained to have a single degree of freedom defining the sensitive axis.

9. The accelerometer of claim 7, wherein the means for determining and storing the relative phase value comprises means for determining the time difference between preselected periodic characteristics of the output signals, means for determining the period of said other output signal, and means for determining a ratio value corresponding to the quotient of said time difference divided by said period.

10. The accelerometer of claim 7, wherein the means for determining the velocity change includes means for adjusting $\Delta W$ at time $t_2$ by $\pm 1$ such that $\Delta W$ for said time interval does not exceed $\pm 0.5$.

11. An accelerometer for measuring velocity change along a sensitive axis during a time interval from $t_{n-1}$ to $t_n$ that includes a subinterval during which electrical power is unavailable comprising:

a pair of first sensors, each first sensor being operative to produce a first output signal having a frequency related to the acceleration along the sensitive axis, the first sensors being arranged such that a given acceleration along the sensitive axis causes the frequency of one first output signal to increase and the frequency of the other first output signal to decrease;

a pair of second sensors, each second sensor being operative to produce a second output signal having a frequency related to the acceleration along the sensitive axis, the second sensors being arranged such that a given acceleration along the sensitive axis causes the frequency of one second output signal to increase and the frequency of the other second output signal to decrease;

means for determining and storing a first relative phase value corresponding to the relative phase of one of the first output signals with respect to the other first output signals at each of times $t_{n-1}$ and $t_n$;

means for determining and storing a second relative phase value corresponding to the relative phase of one of the second output signals with respect to the other second output signal at each of times $t_{n-1}$ and $t_n$;

means for determining values for i and j such that:

$$A_1(\Delta W_1 + i) = A_2(\Delta W_2 + j)$$

where i and j are integers, $A_1$ and $A_2$ are scale constants for the first and second pairs of sensors, respectively, and are not integer multiples of one another, $\Delta W_1$ is the difference between the first relative phase value at time $t_{n-1}$ and the first relative phase value at time $t_n$, and $\Delta W_2$ is the difference between the second relative phase value at time $t_{n-1}$ and the second relative phase value at time $t_n$, whereby velocity change $\Delta V$ between times $t_{n-1}$ and $t_n$ may be determined as:

$$\Delta V = 2\pi A_1(\Delta W_1 + i) = 2\pi A_2(\Delta W_2 + j).$$

12. An accelerometer for measuring velocity change along a sensitive axis, comprising:

a pair of acceleration sensors, each sensor being operative to produce an output signal having a frequency related to the acceleration along the sensitive axis, the sensors being arranged such that a given acceleration along the sensitive axis causes the frequency of one output signal to increase and the frequency of the other output signal to decrease; and means for determining the velocity change $\Delta V$ along the sensitive axis during a selected time interval in accordance with the relation:

$$\Delta V = A_1[(1 - A_2 \Sigma \phi)\Delta \phi + A_3(\Delta \phi)^3 + A_4 \Sigma \phi + A_5(\Delta \phi)^2 + A_0]$$

where $A_0$, $A_1$ and $A_4$ are nonzero constants, $A_2$, $A_3$ and $A_5$ are constants at least one of which is nonzero, T is the length of said time interval, $\Delta \phi$ is the difference between the phase changes of the output signals over said time interval, and $\Sigma\phi$ is the sum of the phase changes of the output signals over said time interval.

13. The accelerometer of claim 12, wherein the means for determining the velocity change includes means for determining the relative phase of one output signal with respect to the other output signal at times $t_{n-1}$ and $t_n$ that correspond to the beginning and ending of said time interval respectively.

14. The accelerometer of claim 13, wherein the means for determining the relative phase comprises means for determining the time difference between preselected periodic characteristics of the output signals, means for determining the period of said other output signal, and means for determining a ratio value corresponding to the quotient of said time difference divided by said period.

* * * * *